(12) United States Patent
Hultén et al.

(10) Patent No.: US 11,267,467 B2
(45) Date of Patent: Mar. 8, 2022

(54) METHOD AND SYSTEM FOR CONTROLLING VEHICLE LANE HOLDING

(71) Applicant: SENTIENT IP AB, Gothenburg (SE)

(72) Inventors: Johan Hultén, Gothenburg (SE); Jochen Pohl, Partille (SE); Ulf Löfqvist, Bredared (SE); Björn Eriksson, Gothenburg (SE); Henrik Weiefors, Gothenburg (SE)

(73) Assignee: SENTIENT IP AB, Gothenburg (SE)

( * ) Notice: Subject to any disclaimer, the term of this patent is extended or adjusted under 35 U.S.C. 154(b) by 87 days.

(21) Appl. No.: 16/638,771

(22) PCT Filed: Sep. 12, 2018

(86) PCT No.: PCT/SE2018/050920
§ 371 (c)(1),
(2) Date: Feb. 13, 2020

(87) PCT Pub. No.: WO2019/059829
PCT Pub. Date: Mar. 28, 2019

(65) Prior Publication Data
US 2021/0129838 A1    May 6, 2021

(30) Foreign Application Priority Data
Sep. 22, 2017    (SE) .................................. 1751179-1

(51) Int. Cl.
*B60W 30/12*        (2020.01)
*B60W 10/20*        (2006.01)
(Continued)

(52) U.S. Cl.
CPC ............ *B60W 30/12* (2013.01); *B60W 10/20* (2013.01); *B62D 5/046* (2013.01); *B62D 6/002* (2013.01);
(Continued)

(58) Field of Classification Search
CPC .................................................... B60W 30/12
See application file for complete search history.

(56) References Cited

U.S. PATENT DOCUMENTS

| | | | |
|---|---|---|---|
| 2013/0231830 A1* | 9/2013 | Van Dan Elzen | .... B60W 10/04 701/42 |
| 2015/0158528 A1* | 6/2015 | Moshchuk | ......... B62D 15/0265 701/41 |

(Continued)

FOREIGN PATENT DOCUMENTS

| | | |
|---|---|---|
| EP | 1 193 160 A2 | 4/2002 |
| WO | 2010/144049 | 12/2010 |

OTHER PUBLICATIONS

International Search Report issued in parent PCT/SE2018/050920, dated Feb. 18, 2019, pp. 1-3.

(Continued)

*Primary Examiner* — Imran K Mustafa
(74) *Attorney, Agent, or Firm* — Jeffrey S. Melcher; Melcher Patent Law PLLC

(57) ABSTRACT

The present invention relates to a method for controlling vehicle lane holding for a vehicle with an electric power assisted steering by means of a steering system (100) with a steering assistance actuator and one or more controllable vehicle state actuators comprising measurement of at least one vehicle position input signal with using an on-board vision system for determination of a relative vehicle lane position in the form of a lateral lane position, a heading angle and a lane curvature, transformation of the relative vehicle lane position to a target yaw and/or lateral vehicle state, measuring at least one steering input signal, determination from said one or more measured steering input (Continued)

signals a torque value applied by the driver via a steering wheel (120), transformation of said torque value to a relative to the afore-mentioned target yaw and/or lateral vehicle state a driver target relative yaw and/or lateral vehicle state, adding said target yaw and/or lateral vehicle state and said driver target relative yaw and/or lateral vehicle state together, and using the resulting yaw and/or lateral vehicle state as a reference signal to one or more controllers for the mentioned control of the one or more vehicle state actuators.

38 Claims, 4 Drawing Sheets

(51) Int. Cl.
*B62D 15/02* (2006.01)
*B62D 5/04* (2006.01)
*B62D 6/00* (2006.01)
*B60W 40/109* (2012.01)

(52) U.S. Cl.
CPC ......... *B62D 15/025* (2013.01); *B60W 40/109* (2013.01); *B60W 2520/12* (2013.01); *B60W 2520/125* (2013.01); *B60W 2520/14* (2013.01); *B60W 2540/18* (2013.01); *B60W 2710/202* (2013.01)

(56) References Cited

U.S. PATENT DOCUMENTS

2017/0247032 A1\* 8/2017 Lee ...................... B62D 15/025
2018/0141588 A1\* 5/2018 Shimizu ............. B62D 15/0265

OTHER PUBLICATIONS

Written Opinion issued in parent PCT/SE2018/050920, dated Feb. 18, 2019, pp. 1-7.
International Search Report issued in parent PCT/SE2018/050966, dated Jan. 24, 2019, pp. 1-3.
Written Opinion issued in parent PCT/SE2018/050966, dated Jan. 24, 2019, pp. 1-7.

\* cited by examiner

METHOD AND SYSTEM FOR CONTROLLING VEHICLE LANE HOLDING

TECHNICAL FIELD

The present invention relates to method for controlling vehicle lane holding for a vehicle with an electric power assisted steering in accordance with the preamble of claim 1 and to a system for controlling the vehicle lane holding of a vehicle with an electric power assisted steering having the features of the first part of claim 19.

BACKGROUND

Lane Keeping Aid, Lane Keeping Support, or Auto Pilot, hereafter referred to as LKA, is a vehicle functionality aiming for helping the driver to keep a vehicle in a road lane. Depending on legislation and development maturity, the guiding principles may differ significantly, spanning from only helping the driver to follow the lane when the driver is detected to steer the vehicle, at least for a reasonable time span, to be holding the steering wheel and potentially also is active to different degree of autonomy, where the driver does not need to be active at all.

Other documented LKA behaviours are functionalities that do not guide the driver continuously, but only when the driver is about to drift out of lane.

Traditional LKA variants, as e.g. described above, are lacking a good interaction with the driver in a series of important situations:

The driver might not always want to drive in the middle of the lane, but rather to one side of the lane. The reason for that can be e.g. because the lane is very wide as it is for some expressways and that the driver wants to pass or wants to let someone else pass. This is especially common for trucks. Another important aspect for heavy trucks is that the driver might want to centre the trailer rather than the towing vehicle (as a consequence of e.g. weak road sides). Other situations where the driver often wants to position the vehicle out of lane centre are when the lane has longitudinal ruts that the driver wants to avoid. These ruts are often water-filled. There might also be accidents or tyre shifting in the roadway. Yet another situation is when there are road constructions, so that the driver wants to increase the distance to e.g. barriers.

Another common situation where LKA lacks interaction with the driver is when the driver wants to change lane. It is often so that the LKA function needs to be turned off during the lane change.

The consequence of the two afore-mentioned LKA shortcomings are that the driver does not appreciate the LKA functionality.

SUMMARY

It is therefore an object of the present invention to provide a method and a system respectively through which one or more of the above-mentioned problems and shortcomings are overcome.

According to one aspect of the present invention, it is an objective to provide a system and a method respectively allowing to control the vehicle both from the information from the traditional LKA as well as add the ability to add a driver input in order to make the driver being able to control both the lane position as well as being able to change lane during LKA control with kept continuous control—a so called mixed control.

It is a particular object to provide a system and a method respectively in controlling the vehicle lane trajectory of a vehicle.

These objects are achieved through a method and a system respectively as initially referred to having the features of the respective independent claims.

Advantageous embodiments are given by the dependent claims, and are discussed in the description.

Particularly, in an advantageous embodiment, a mixed control as referred to above is achieved as follows:

A vehicle position identification functionality identifies the vehicle position in relation to the actual lane of the road by information achieved from an on-board vision system, an on-board lidar system, an on-board radar system, an on-board tele-communication system or an on-board GPS system. The data achieved is in the form of e.g. a lateral lane position, a heading angle and a lane curvature. The LKA functionality further is used to calculate a target vehicle path in relation to the afore-mentioned vehicle position in relation to the actual lane. Thus, the target vehicle path needed to control the vehicle according to the afore-mentioned traditional LKA is available.

In parallel to this vehicle position identification, a driver intended vehicle lane position identification is made. It is in Birk (WO 2010144049 A1) shown that a driver is controlling the lateral state of the vehicle by means of applying a torque to a steering wheel. This torque is transformed into a target lateral vehicle state relative to the above-mentioned target vehicle state.

With these two target vehicle paths, it is, in accordance to this aspect of the present invention, possible to add the two target vehicle paths to achieve a mixed control of the vehicle path so that the lane can be followed at the same time as the lane position within the lane or even outside the lane can be controlled by the driver.

Further embodiments are described in the detailed description as well as in the dependent claims.

It will be appreciated that features of the invention are susceptible to being combined in any combination without departing from the scope of the invention as defined by the accompanying claims.

Advantageous embodiments are given by the respective appended dependent claims.

BRIEF DESCRIPTION OF THE DRAWINGS

The invention will in the following be further described by way of example only, in a non-limiting manner, and with reference to the accompanying drawings, in which.

Figure 1:
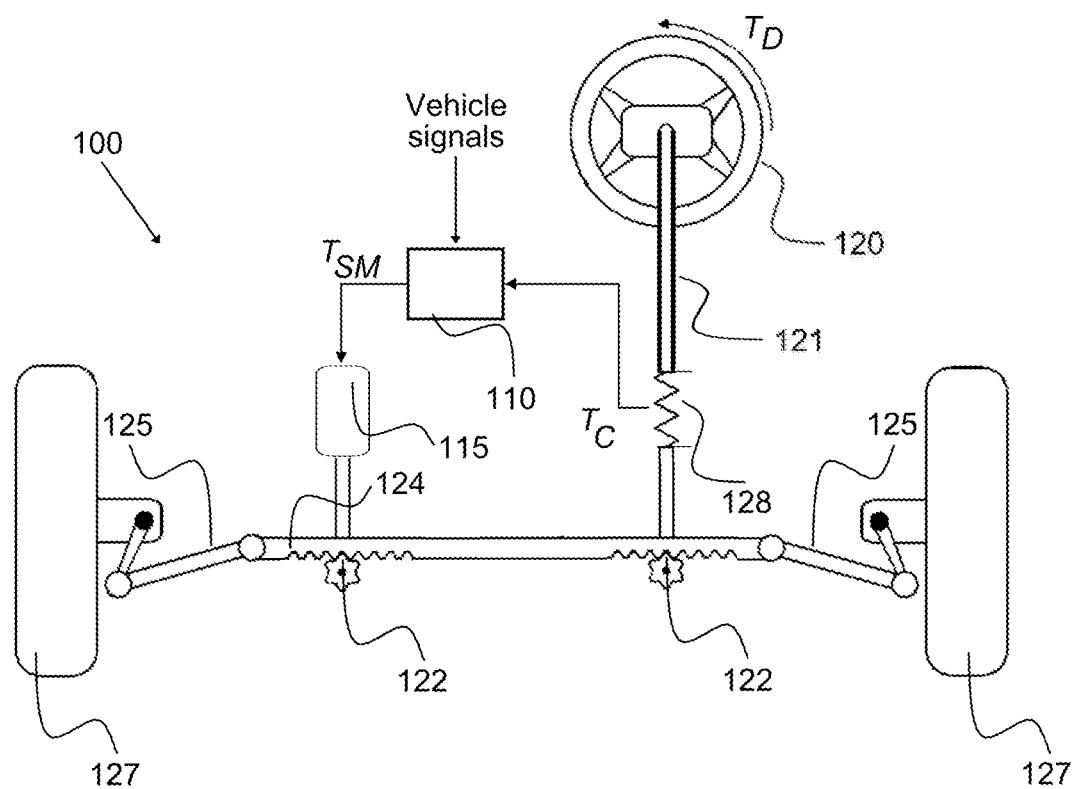
FIG. 1 is a schematic figure showing a steering system for power assisted vehicle steering.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims and the description as a whole. It should be further understood that the drawings are not necessarily drawn to scale and that, unless otherwise indicated, they are merely intended to conceptually illustrate the structures and procedures described herein. The same reference numerals are used for illustrating corresponding features in the different drawings.

DETAILED DESCRIPTION

FIG. 1 is a schematic figure of a steering system 100 for which the inventive concept can be implemented. In a power assisted steering system of a vehicle, there is a linkage between the front axle road wheels 127 and the steering wheel 120. The linkage consists of a steering rack 124 with associated tie rods 125 connected via a pinion 122 to the steering column 121. The steering column 121 incorporates a torsion bar 128 with a torque sensor for measuring the steering torque applied by the driver. The assistance torque is actuated by a steering assistance actuator, which consists of an assistance motor 115 and an ECU 110. The control of the level of assistance actuation in the steering assistance actuator is controlled by a control system in the ECU.

Figure 2:
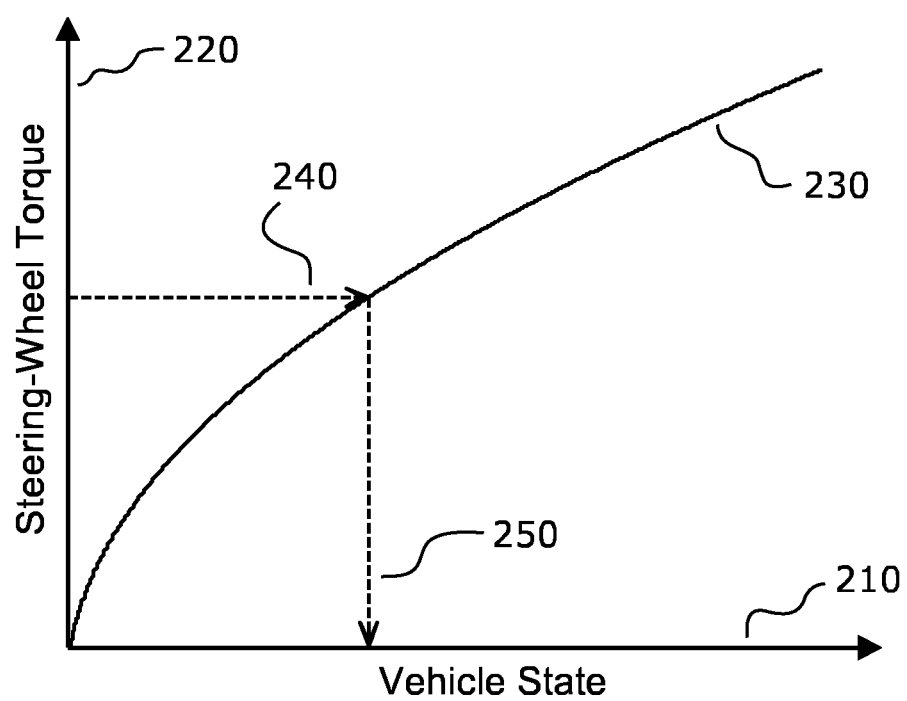
FIG. 2 is a schematic figure showing the relation between the vehicle state and the steering-wheel torque.

FIG. 2 is a schematic figure showing the relation between a vehicle state 210 on the abscissa and a steering-wheel torque 220 on the ordinate. The solid line 230 corresponds to a reference relation between the vehicle state and the steering-wheel torque. Dashed line 240 corresponds to how a steering-wheel torque is used to achieve a working point on the reference relation between the vehicle state and the steering-wheel torque. Dashed line 250 corresponds to how a working point on the reference relation between the vehicle state and the steering-wheel torque is used to achieve a target vehicle state. A steering-wheel torque can thus, according to the present invention, by the before-mentioned dashed lines 240 and 250 be transformed to a target vehicle state.

Figure 3:
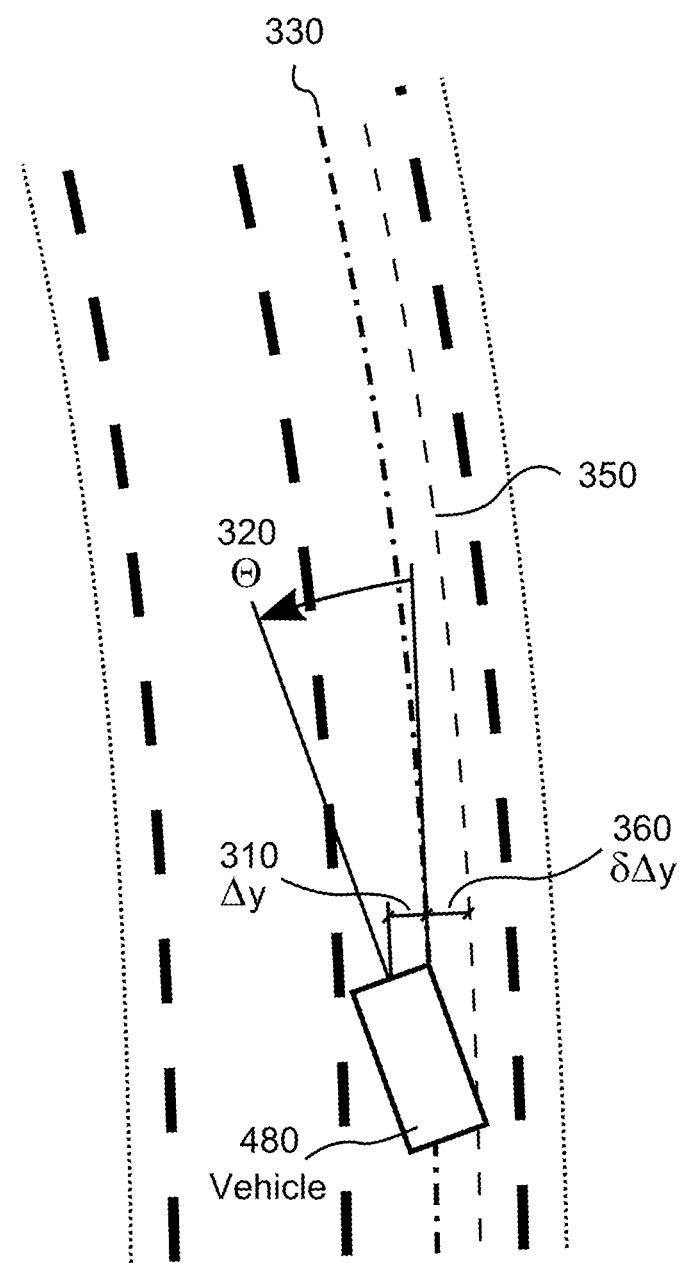
FIG. 3 is a schematic figure showing a vehicle on a road with position indicating variables.

FIG. 3 is a schematic figure showing exemplary position indicating variables related to the vehicle position on or within the lane. A vehicle 480 is located in a lane, with a lateral lane position, $\Delta y$ 310, from the centreline 330 of the lane and with a heading angle, $\Theta$ 320, from the tangent of the centreline of the lane. The centreline 330 of the lane has a lane curvature, $\kappa$, and a spatial lane curvature derivative, $\kappa'$, with respect to the forward distance from the current position. The driver can have, as will be further described in the embodiments below, an intention to position the vehicle in a position that differs from a target centre line 350 of the lane with a delta lateral lane position $\delta \Delta y$ 360.

Figure 4:
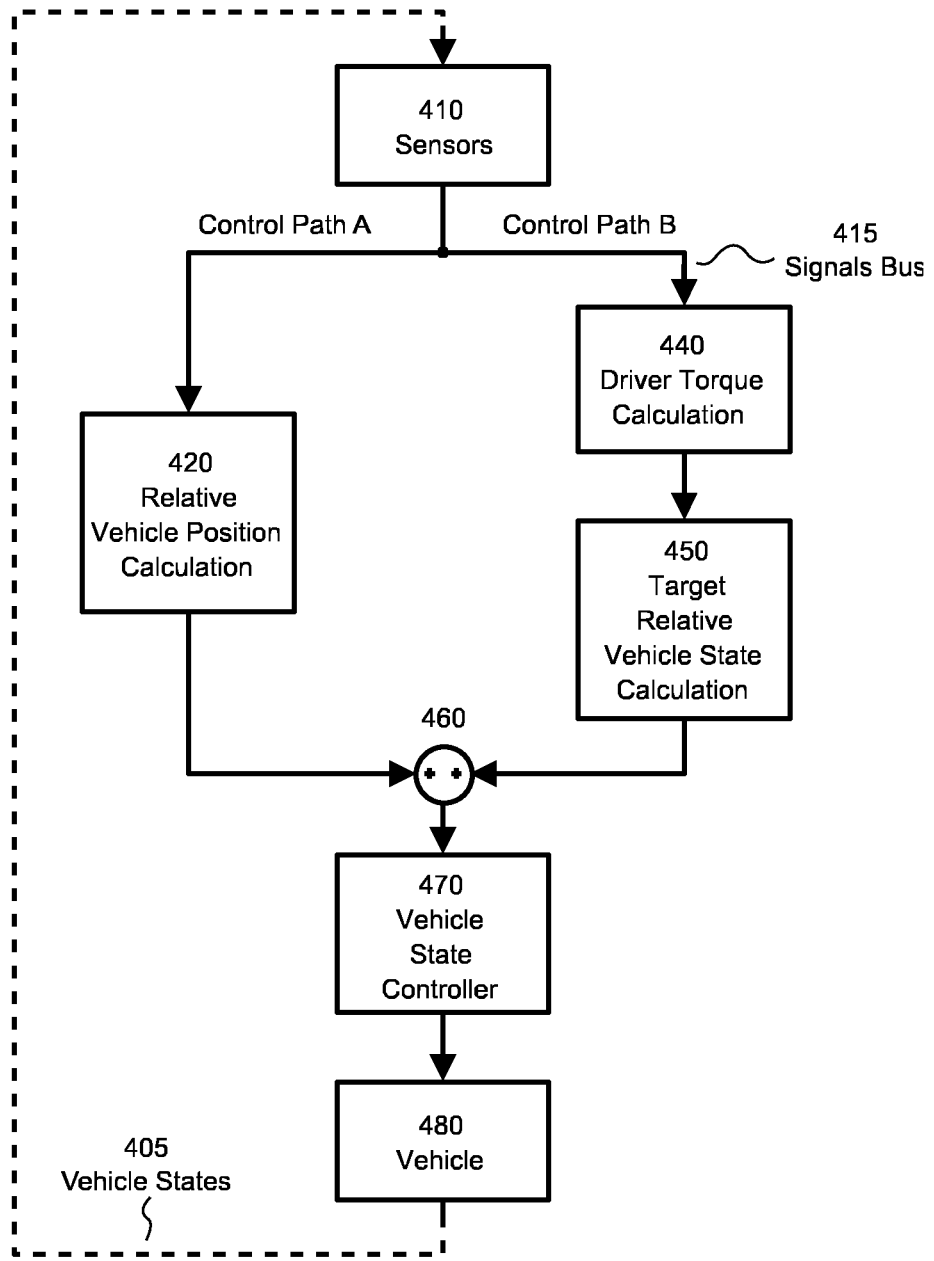
FIG. 4 is a schematic figure showing a control diagram for the control of the lateral vehicle state.

FIG. 4 is a schematic figure showing a control scheme over several control steps according to the invention. A vehicle 480, with its several subsystems, has at every time a number of states, where a state is defined as a translational or rotational position, a velocity or an acceleration. These states are schematically represented by a dashed line 405. The vehicle 480 is equipped with a number of sensors 410 for direct or indirect measurements of the one or more vehicle states. Different types of sensors can be used such as a torsion-bar torque sensor, a steering-wheel angle sensor, vehicle wheel speed sensors, a vehicle yaw rate sensor, a vehicle lateral acceleration sensor or a cluster of vehicle velocity, rotational speed sensors and on-board vision systems. The sensed or measured value or values of the vehicle state or states 405 is/are communicated to the control steps by the use of a signal bus 415, where a signal bus is a transmission path on which signals can be read and/or transmitted. For the control of the vehicle 480, there are according to the invention two control paths (A and B), namely an LKA path A indicated by 410-420-460-470-480 and a driver torque control path B indicated by 410-440-450-460-470-480.

The LKA path A comprises a relative vehicle position calculation function, or means, 420, e.g. software in an electronic control unit, a microprocessor, where the on-board vision system sensor signals are used to calculate a number of vehicle position signals, or vehicle position indicating variables, at least a vehicle lateral lane position, which is the distance from the centre of the vehicle to the centre of the lane, and in advantageous embodiments one or more of a vehicle heading angle, which is the angle between the direction in which the vehicle is heading and the angle of the lane, a lane width, a curvature and a curvature derivative of the lane.

The driver torque control path B comprises a driver torque calculation function, or means, 440, e.g. comprising software of a control unit, e.g. a microprocessor, which can be programmed/made such that a steering-wheel torque in FIG. 2 is a measure of a torque applied by the driver via a steering wheel.

The driver torque control path B also comprises a target relative vehicle state calculation function, means, 450 (software in a control unit, a microcomputer) which is a mathematical function that for a specific vehicle speed transforms a driver torque to a lateral vehicle state; at least one of the following states or a linear combination of one or more of the following states; vehicle yaw rate or acceleration, vehicle lateral speed or acceleration, vehicle curvature and vehicle body sideslip angle. The lateral vehicle state may, unless it is a position as discussed above, furthermore be integrated into a target relative vehicle lateral lane position (integrated once if it is proportional to the lateral velocity; integrated twice if it is proportional to a lateral acceleration).

The vehicle lateral lane position ($\Delta$) obtained from the relative vehicle position calculation function 420 of control path A and the target relative vehicle lateral lane position ($\delta \Delta$) obtained from the relative vehicle position function 450 of control path B are added together in an addition function or addition step (software) 460 forming a target vehicle lateral lane position. At least the target vehicle lateral lane position, or, in alternative, advantageous embodiments also one or more of the vehicle heading angle, the curvature and the curvature derivative of the lane, is/are used in a vehicle state controller 470 to achieve the target lateral position of the vehicle 480 in a controlled manner.

For facilitating the reading of the description of advantageous embodiments, below a section containing definitions used in the following description as well as some functional explanations.

Definitions

An on-board vision system is a vehicle position identification functionality that identifies the vehicle position in relation to the actual lane of the road by information achieved from an on-board camera system, an on-board lidar system, an on-board radar system, an on-board tele-communication system and/or an on-board GPS system that also can be linked to map data so that the lane curvature and the lane curvature derivative can be achieved also in that way and possibly sensor fusion of them. The data achieved is in the form of e.g. a lateral lane position, and optionally e.g. one or more of a heading angle, a lane curvature and a lane curvature spatial derivative with respect to the forward distance from the current position. The LKA functionality further is used to calculate a target vehicle path in relation to the afore-mentioned vehicle position in relation to the actual lane. Thus, the target vehicle path needed to control the vehicle according to the afore-mentioned traditional LKA is available. The lane centre with its lateral position, e.g. one or more of the heading angle, the lane curvature and the lane curvature derivative can be used to calculate a target positioning vector consisting of the elements for the look-ahead distance comprising at least;

a target lateral position, which is 0—the lateral position as the target is the centre of the lane (lateral position 0), and in alternative embodiments it also consists of one or more of;

a target heading angle, which is 0—the heading angle mutatis mutandis, a target curvature, which is the curvature of the lane, a target curvature derivative, which is the spatial curvature derivative of the lane with respect to the forward distance from the current position.

A steering position actuator is an actuator which can be used to influence one or more of the steering actuator states, such as the rear wheel steering angle, the individual steering angles of the wheels, the axle braking torque or force, the wheel braking torque or force, the driving torque or force on the individual axles, the driving torque or force on the individual wheels, the camber angle on each axle, or the camber angle on each wheel.

A state is defined as a translational or rotational position, a velocity or an acceleration, or from one or more of these states derived states, such as e.g. a vehicle slip angle, which is the angle between the vehicle local x-axis and the vehicle speed vector.

A signal bus is a transmission path on which signals can be read and/or transmitted.

Steering feel is built of the sum of at least some of the following building blocks:

a lateral acceleration feedback torque, a tyre friction torque, a steering system friction torque, a damping torque, and a returnability torque.

A lateral acceleration feedback torque is a torque felt by the driver that corresponds to the lateral acceleration of the vehicle.

A tyre friction torque is the friction between the tyres and the road or a model of this friction.

A steering system friction or a friction torque is the friction of the parts of the linkage of the steering system or a model of this friction.

A damping torque occurs owing to damping of the tyres and the steering system or a model of this damping.

A returnability torque comes from the geometry of the steering system or a model of the steering system.

These torque contributions can be vehicle speed dependent. The torque contributions can also be calculated via mathematical models or sensed via sensors in the vehicle or steering system.

A compensation torque is one of, or the sum of one or more of, the above-mentioned tyre friction torque, the friction torque, the damping torque and the returnability torque. The parts of the compensation torque are calculated from mathematical models of the different torque parts.

The lateral acceleration torque is calculated from a bicycle model, which uses vehicle speed and steering angle as input, and give the lateral acceleration as output. The lateral acceleration feedback is a function of the lateral acceleration calculated from the vehicle model.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function. The model of the tyre friction is the combination of the hysteresis and the relaxation so that there e.g. can be an increase owing to the hysteresis torque taking place at the same time as the torque decreases owing to the relaxation. The resulting torque of the model is then the sum of the two parts.

The mathematical model of the friction torque is a model of an angle or angular speed driven hysteresis. The maximum torque in the hysteresis can be shaped by a function so that the maximum torque is different on centre compared to off centre.

The mathematical model of the damping torque consists of a damping constant times an angular speed or translational speed, such as e.g. the rack velocity, measured somewhere in the linkage between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

A returnability torque is a vehicle speed dependent and steering-wheel angle dependent torque.

A driver torque is the torsion-bar torque compensated with a compensation torque as discussed above.

Controllability describes the ability of an external input to move the internal state of a system from any initial state to any other final state in a finite time interval.

A vehicle state controller is here defined as a dynamic function for achieving a target state in a vehicle in a controlled manner.

A PID controller is a proportional-integral-derivative controller, which is a control loop feedback mechanism widely used in industrial control systems and a variety of other applications requiring continuously modulated control. A PID controller continuously calculates an error value e(t) as the difference between a target value and a measured process value and applies a correction based on proportional, integral, and derivative terms (denoted P, I, and D respectively) which give their name to the controller. In practical terms it automatically applies accurate and responsive correction to a control function. An everyday example is the cruise control on a road vehicle; where external influences such as gradients would cause speed changes, and the driver has the ability to alter the desired set speed. The PID algorithm restores the actual speed to the desired by controlling the power output of the vehicle's engine. A PID controller, the I-part of a PID controller, can sometimes suffer from integral windup.

Integral windup, also known as integrator windup or reset windup, refers to the situation in a PID feedback controller where a large change in target value occurs (say a positive change) and the integral terms accumulates a significant error during the rise (windup), thus overshooting and continuing to increase as this accumulated error is unwound (offset by errors in the other direction).

The specific problem is the excess overshooting.

Anti-windup is a term for a set of solution to the problem of integral windup. This problem can be addressed by:

Initialising the controller integral to a desired value, for instance to the value before the problem.

Increasing the target value in a suitable ramp.

Disabling the integral function until the to-be-controlled process variable has entered the controllable region.

Preventing the integral term from accumulating above or below pre-determined bounds.

Back-calculating the integral term to constrain the process output within feasible bounds.

A vehicle state actuator, is an actuator that when actuated influences one or several vehicle states. Examples of vehicle state actuators are brakes, engine, controllable four-wheel-drive clutches, controllable differentials, active dampers, electric or hydraulic wheel motors and electrically or hydraulically driven axles.

An actuator is a mechanism or system that is operated by an ECU and converts a source of energy, typically electric current, hydraulic fluid pressure, or pneumatic pressure, into a motion, force or torque.

A target value, reference value or request is a set point for the actuator that is achieved by the use of either a closed loop controller and/or a feed-forward controller.

A vehicle model is a mathematical model that transforms a road-wheel angle and a vehicle speed to a number of vehicle yaw and/or lateral states, e.g. vehicle yaw rate and acceleration, vehicle lateral speed and acceleration, vehicle curvature and vehicle body sideslip angle.

A transformation is defined as a mathematical function or lookup table with one input value used to produce one output value. That means that a transformation can be used, with its tunable parameters, to create a relation between the input value and the output value with arbitrary tunable shape. A transformation can have time-varying parameters that are even dependent on other values, a so-called gain scheduling, so that the transformation is a function with parameters that themselves are functions. An example of such a transformation is a vehicle state to driver torque relation where the relation is a vehicle speed dependent continuously rising, degressive shaped function.

A transfer function is the relation of the outputs of a system to the inputs of said system, in the Laplace domain, with the variable s, considering its initial conditions. If we, as an example of a single input, single output system, have an input function of $X(s)$, and an output function $Y(s)$, the transfer function $G(s)$ is here defined to be $Y(s)/X(s)$.

A steering-wheel torque measurement is a torque measured in the steering column or steering wheel or a force measured in the steering rack times the torque ratio between the steering rack and the steering wheel.

A steering-wheel angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

A trailer arrangement is defined as a passenger car trailer or caravan, or for a heavy truck a full-trailer, supported by front and rear axle or axles and pulled by a drawbar, a semi-trailer, or a dolly with a semi-trailer.

The steering angle, which is here shown for one wheel, but if the wheels are steered differently, as in the case for e.g. Ackermann steering, the steering angle is defined as the mean value of the angles of the two wheels.

A natural coordinate system or natural coordinates is another way of representing direction. It is based on the relative motion of the object of interest, the vehicle, rather than a fixed coordinate plane (x, y). The unit vectors (t, n) are:

t is oriented parallel to the horizontal velocity at each point, n is oriented perpendicular to the horizontal velocity and pointing positively to the left.

According to one aspect of the present invention, as also referred to earlier in this application, it is an objective to control the vehicle both from the information from a traditional LKA as well as add the ability to add a driver input in order to make the driver being able to control both the lane position as well as being able to change lane during LKA control with kept continuous control—a so called mixed control.

Such a mixed control is in a first advantageous embodiment achieved by a series of steps according to FIG. 4:

In control path A, the following method steps are taken:

In the relative vehicle position calculation function (also called means) 420, the sensor signals from the on-board vision system are, according to the definition above, used for:

Calculation of the lateral position of the centre of the lane relative to the vehicle.

Calculation of the heading angle of the lane relative to the vehicle.

Calculation of the curvature of the lane.

Calculation of the spatial lane curvature derivative with respect to the forward distance from the current position.

These four measures of the vehicle states, lateral position, heading angle, lane curvature and lane curvature derivative are measured and/or calculated for a distance in front of the vehicle, a look-ahead distance.

It is the centre of the lane and its heading angle, lane curvature and lane curvature derivative that represent the target vehicle states.

After the relative vehicle position calculation in the relative vehicle position calculation function 420, the target values for the case when the vehicle is to be controlled to the centre of the lane are known. The output of the relative vehicle position calculation function 420 is here a target positioning vector consisting of the elements for the look-ahead distance comprising at least;

the target lateral position. In alternative embodiments it also consists of one or more of:

a target heading angle, a target curvature, a target curvature derivative.

In control path B, the following method steps are taken:

In the driver torque calculation function (also called means) 440, the sensor signals from the steering system are, according to the definition above, used for:

Calculation of a torque applied by the driver, a driver torque, which as such is an indicative of the driver intention. This driver torque is in one embodiment the torsion-bar torque signal.

In an alternative embodiment, the driver torque is the torsion-bar torque compensated with a compensation torque, as defined above.

In the target relative vehicle state calculation in the target relative vehicle state calculation function (also called means) 450, the driver torque is, according to the definition above, used for:

A transformation of the driver torque to a target delta vehicle state (e.g. $\delta \Delta y$; cf. FIG. 3, possibly after one or two integrations depending on variable (velocity or acceleration, see above). Note that in this transformation of the driver torque to a target delta vehicle state, a threshold value in the driver torque is beneficial and may be used in some implementations in order not to transform small driver torques or noise to a target delta vehicle state.

In a first example of a driver torque transformation, this target delta vehicle state is a delta lateral velocity relative to the target trajectory calculated in the relative vehicle position calculation function 420 above, or in other words a delta lateral vehicle velocity in the natural coordinates of the target trajectory calculated in the relative vehicle position calculation 420.

In a second example of a driver torque transformation, this target delta vehicle state is a delta lateral acceleration relative to the target trajectory calculated in the relative vehicle position calculation function 420 above, or in other words a delta lateral vehicle acceleration in the natural coordinates of the target trajectory calculated in the relative vehicle position calculation function 420.

In a third example of a driver torque transformation, this target delta vehicle state is a vehicle slip angle which in essence is the same as in the first driver torque transformation except that the slip angle is the lateral velocity divided by the vehicle speed.

In a fourth example of a driver torque transformation, this target delta vehicle state is a curvature which in essence is the same as in the second driver torque transformation except that the curvature is the lateral acceleration divided by the square of the vehicle speed.

In a fifth example of a driver torque transformation, this target delta vehicle state is a yaw rate which in essence is the same as in the second driver torque transformation except that the yaw rate is the lateral acceleration divided by the vehicle speed.

In a sixth example of driver torque transformation, this target delta vehicle state is a relative lateral position.

An integration of the target delta vehicle state such that the resulting vehicle state will be a target delta lateral position, where a target delta lateral position is a relative distance from the lateral position as calculated in the relative vehicle position calculation function 420.

In a first implementation the first target delta vehicle state is a delta lateral velocity, which then is integrated in an integration function of the target relative vehicle state calculation function 450 one time to achieve a target delta lateral position.

In a second implementation the target delta vehicle state is a delta lateral acceleration which then is integrated in an integration function of the target relative vehicle state calculation function 450 twice to achieve a target delta lateral position.

In a third implementation the delta vehicle state is a delta lateral vehicle slip, and the delta lateral vehicle slip times the vehicle speed is integrated one time in an integration function of the target relative vehicle state calculation function 450 to achieve a target delta lateral position.

In a fourth implementation the target delta vehicle state is a delta curvature, and the delta curvature times the square of the vehicle speed is integrated twice in an integration function of the target relative vehicle state calculation function 450 to achieve a target delta lateral position.

In a fifth embodiment the target delta vehicle state is a delta yaw rate, and the delta yaw rate times the vehicle speed is integrated twice in an integration function of the target relative vehicle state calculation function 450 to achieve a target delta lateral position.

In a sixth embodiment the target delta vehicle state is a relative lateral position. Then there is no need for an integration to achieve a target delta lateral position.

Finally, the target delta lateral position can be a linear combination of two or more of any ones of the six target delta lateral positions above.

Note specifically that in the sixth target delta vehicle state, the driver intention in the form of the driver torque is directly transformed to a target delta lateral position. This means that in this specific embodiment, there is no integration and hence there is no "memory" in the positioning of the vehicle relative to the centre of the lane, and therefore, the positioning of the vehicle is directly achieved by the driver torque. Hence, there is in this example a possibility for the driver to steer relative to the target vehicle state.

After the two control paths, A and B, there is an addition performed in addition function or addition step 460 where the target lateral position (e.g. $\Delta y$, cf FIG. 3) and the target delta lateral position (e.g. $\delta \Delta y$, cf FIG. 3) are added together into a mixed control target lateral position. The other positions of the target positioning vector (here) are unchanged and the output of the addition in the addition 460 is a mixed control target positioning vector consisting of the elements for the look-ahead distance comprising at least;

the mixed control target lateral position. In alternative embodiments it also consists of one or more of:
a target heading angle,
a target curvature,
a target curvature derivative.

In the vehicle state controller 470, the vehicle path is controlled in the following method steps:

Calculation of a target yaw and/or lateral vehicle state.
Controlling the vehicle actuators towards this target yaw and/or lateral vehicle state.

In a first embodiment of the first method step of 470 comprising the calculation of a target yaw and/or lateral vehicle state, at least one of a feed-forward controller and one or two feedback controllers can be used in any combination for calculating a target vehicle state, e.g. a target vehicle lateral acceleration, as a sum of the target vehicle states from the used feed-forward and/or feedback controllers respectively.

In a first embodiment, for calculation of a target yaw and/or lateral vehicle state comprising a feed forward curvature, a feed-forward controller is used to calculate a target lateral acceleration. This calculation is made by first calculating the curvature function of the distance, which is the sum of the curvature and the spatial curvature derivative with respect to the forward distance from the current position times the distance in the look-ahead frame of interest. With the vehicle speed, this function is converted to a function of time rather than of distance. The feed forward target lateral acceleration is the curvature function of the distance times the square of the vehicle speed.

In embodiments comprising the use of one or more feedback controllers, instead of, in addition to, a feed forward controller, the feedback controllers may comprise one controller, e.g. a PID controller, on the lateral position error and/or a controller, e.g. a PID controller, on the heading angle error. These controllers can preferably, in order to have a smooth control, have anti-windup.

Furthermore, they can have gain scheduling with regards to vehicle speed in order to result in the same stability margin over vehicle speed.

It should be clear that the feed forward and the feedback controllers discussed above can be used in any combination and in any number. Generally the performance will be better if there are more controllers, e.g. one feed forward controller and two feedback controllers functioning as mentioned above.

Besides the before-mentioned target vehicle lateral acceleration, other possible target feed forward and feedback vehicle states are curvature, road-wheel angle, steering-wheel angle, vehicle lateral velocity, vehicle slip angle and vehicle yaw rate or linear combinations thereof, or in other words, the target can be generalized to target yaw and/or lateral vehicle states.

In a second embodiment of the calculation of a target yaw and/or lateral vehicle state, the trajectory between the current positioning vector and a future mixed control target positioning vector in the form of a polynomial. The starting point can be described by its y coordinate, its heading angle and its curvature. The target point can be described by its x coordinate, its heading angle and its curvature. A sixth order polynomial will fit to such boundary conditions. From such a polynomial, the target yaw and/or lateral vehicle state can be calculated and thus, the path will, as long as the target yaw and/or lateral vehicle state control fulfills its goal, be fulfilled.

In a third embodiment of the calculation of a target yaw and/or lateral vehicle state, the trajectory between the current positioning vector and a future mixed control target positioning vector is in the form of a conic spline. The starting point can again be described by its y coordinate, its heading angle and its curvature. The target point can be described by its x coordinate, its heading angle and its curvature. A conic spline will, with its three points coordinates, fit to such boundary conditions. From such a conic spline, the target yaw and/or lateral vehicle state can be calculated and again, the path will, as long as the target yaw and/or lateral vehicle state control fulfills its goal, be fulfilled.

From these three embodiments, it can be seen that there can be a general form of transfer function between the mixed control target positioning vector and the target yaw and/or lateral vehicle state.

In a first embodiment of the second method step of the step 470 for the calculation of a target yaw and/or lateral vehicle state, which comprises controlling the vehicle actuators towards this target yaw and/or lateral vehicle state, the target yaw and/or lateral vehicle state function of time is fed through an inverse vehicle model. That means that, ideally, with vehicle speed and vehicle model, the target vehicle actuator states will be such that the vehicle path will follow the target vehicle path.

In the case of front-wheel steering only, the target vehicle actuator state is the front-wheel angle. This angle is controlled in a typical front steering gear of the vehicle 480 with a road-wheel angle interface or a steering-wheel angle interface times the ratio to the road wheels.

In the case of front-wheel and rear-wheel steering, the target vehicle actuator states are the front-wheel and rear-wheel angles. These angles are controlled in typical front and rear steering gears of the vehicle 480 with a road-wheel angle interface or a steering-wheel angle interface times the ratio to the road wheels and a rear-wheel angle interface.

In an alternative implementation of control path B, the target relative vehicle state calculation shall have an addition of a function to achieve a target delta lateral position such that e.g. a trailer can be centred in the lane rather than the towing vehicle. From the curvature of the road and a vehicle model of the vehicle combination it is well known for the person skilled in the art to calculate such a target delta lateral position to be further added to the original target delta lateral position.

In other alternative implementations of the control paths, A and B, the driver torque can be used to calculate a driver intended heading angle relative to the path of the road, i.e. a heading angle relative to the natural coordinates of the road. When this heading angle is pointing, with a pre-defined forward distance, to the adjacent lane, the driver is assumed to indicate that the vehicle shall change lane. Thus, the lateral position will change to the lateral position of the new target lane. This possibility to be able to indicate that the lane is to be changed shall preferably be accompanied by the driver pushing the direction indicator, and otherwise neglected. The target delta lateral position, if any at the time of lane change shall be emptied (set to zero). When the lane change occurs, the transition of the target lateral position can furthermore be made smooth by ramping over to the new value over a specified tunable time.

With the two target vehicle paths, control path A and control path B, all combinations of alternatives, it is, in accordance to this aspect of the present invention, possible to add the two target vehicle paths to achieve a mixed control of the vehicle path so that the lane can be followed at the same time as the lane position within the lane or even outside the lane can be controlled by the driver.

It should be clear that the invention is not limited to the specifically illustrated embodiments but that it can be varied in a number of ways within the scope of the appended claims.

The invention claimed is:

1. A method for controlling vehicle lane holding for a vehicle comprising an electric power assisted steering by a steering system with a steering assistance actuator and one or more controllable vehicle state actuators and comprising an on-board vision system, incorporating the steps of:
   measuring by a control unit at least one vehicle position input signal representing one or more vehicle states, with the aid of the on-board vision system, using one or more vehicle state sensors in communication with the control unit,
   determining, in a relative vehicle position calculation function programmed in the control unit, from said one or more measured vehicle position input signals of a relative vehicle lane position in the form of, but not limited to, a vehicle lateral lane position, a vehicle heading angle, a lane curvature and/or a lane curvature derivative,
   calculating, in the relative vehicle position calculation function programmed in the control unit, of a target positioning vector comprising one or more of the following target values; a target lateral position, a target heading angle, a target curvature and a target curvature derivative,
   measuring at least one steering input signal by a sensor,
   determining in a driver torque calculation function programmed in the control unit, from said one or more measured steering input signals, of a torque value applied by the driver via a steering wheel,
   transforming, in a target relative vehicle state calculation function programmed in the control unit, said torque value applied by the driver to a target delta positioning vector, adding said target positioning vector and said target delta positioning vector together to form a mixed control target lateral state vector, and using the mixed control target positioning vector as reference signal to one or more vehicle state controllers for the control of the one or more vehicle state actuators.

2. The method according to claim 1, wherein the target relative vehicle state calculation function contains a calculation and subtraction of an additional target delta lateral position for the lateral position of a trailer, so that the trailer rather than the vehicle is positioned in the lane.

3. The method according to claim 1, comprising transforming by the control unit the torque value applied by the driver to a driver intended heading angle relative to the path of the road and when this driver intended heading angle relative to the path of the road is pointing, with a predefined, velocity dependent forward distance to an adjacent lane, the driver is assumed to indicate that the vehicle should change lane and the target delta lateral position changes to the target delta lateral position of the target lane, whereby the vehicle will change and keep lane to the new target lane.

4. The method according to claim 1, wherein the one or more of the following target values of the target positioning vector; a target lateral position, a target heading angle, a target curvature and a target curvature derivative, is a curvature, and that the one or more vector elements of the target delta positioning vector is a curvature, so that when adding said target positioning vector and said target delta positioning vector together, the result will be a mixed control target positioning vector and a steering feel torque build-up around the natural coordinates of the road.

5. The method according to claim 1, wherein the driver torque calculation function includes using the sensor signals from the steering system, for calculation of a torque applied by a driver of the vehicle.

6. The method according to claim 1, wherein the target delta vehicle state is a relative lateral position and the method comprises the step of, in the target relative vehicle state calculation function, transforming the driver torque to a relative lateral position.

7. The method according to claim 1, wherein the target delta vehicle state is a delta lateral velocity relative to a target trajectory calculated in the relative vehicle position calculation function, and the method comprises the step of, in the target relative vehicle state calculation function transforming the driver torque to a relative lateral position, integrating, in an integration function, the delta lateral velocity once to provide a delta lateral position forming the target delta positioning vector.

8. The method according to claim 1, wherein the target delta vehicle state is a delta lateral acceleration relative to a target trajectory calculated in the relative vehicle position calculation function, and the method comprises the step of, in the target relative vehicle state calculation function transforming the driver torque to a relative lateral position, integrating, in an integration function, the delta lateral acceleration twice to provide a delta lateral position forming the target delta positioning vector.

9. The method according to claim 1, wherein the target delta vehicle state is a delta lateral vehicle slip angle relative to a target trajectory calculated in the relative vehicle position calculation function, and the method comprises the step of, in the target relative vehicle state calculation function transforming the driver torque to a relative lateral position, integrating, in an integration function, the delta lateral vehicle slip times the vehicle speed once to provide a delta lateral position forming the target delta positioning vector.

10. The method according to claim 1, wherein the target delta vehicle state is a delta curvature relative to a target trajectory calculated in the relative vehicle position calculation function, and the method comprises the step of, in the target relative vehicle state calculation function transforming the driver torque to a relative lateral position, integrating, in an integration function, the delta lateral curvature times the square of the vehicle speed twice to provide a delta lateral position forming the target delta positioning vector.

11. The method according to claim 1, wherein the target delta vehicle state is a delta yaw rate relative to a target trajectory calculated in the relative vehicle position calculation function, and the method comprises the step of, in the target relative vehicle state calculation function transforming the driver torque to a relative lateral position, integrating, in an integration function, the delta yaw rate times the vehicle speed to provide a delta lateral position forming the target delta positioning vector.

12. The method according to claim 1, wherein, the target delta vehicle state is a linear combination of one or more of the delta lateral position, delta lateral velocity, delta lateral acceleration, delta lateral vehicle slip angle, delta curvature and delta yaw rate.

13. The method according to claim 1, wherein, in the target relative vehicle state calculation function transforming the driver torque to a relative lateral position, a threshold value is used for the driver torque, only allowing driver torques exceeding said threshold value to be transformed to a target delta vehicle state.

14. The method according to claim 1, wherein the mixed control target positioning vector at least comprises a mixed control target lateral position.

15. The method according to claim 14, wherein the mixed control target positioning vector further comprises one or more of a target heading angle, a target curvature and a target curvature derivative.

16. The method according to claim 1, comprising the steps of, in the vehicle state controller, calculating a target yaw and/or lateral vehicle state; and controlling the vehicle actuators towards said target yaw and/or lateral state.

17. The method according to claim 16, wherein the step of calculating a target yaw and/or lateral vehicle state comprises using at least one of a feed-forward controller and/or one or two feedback controllers.

18. The method according to claim 16, wherein the step of calculating a target yaw and/or lateral vehicle state comprises using a sixth order polynomial or a conic spline describing the trajectory between a current positioning vector and a future mixed control positioning vector, the starting point being described by a y-coordinate, a heading angle and a curvature, the target point being described by a x-coordinate, the heading angle and the curvature.

19. The method according to claim 1, wherein the driver torque calculation function includes using the sensor signals from the steering system for calculation of a torque applied by a driver of the vehicle including torsion-bar torque signal or a torsion bar torque compensated with a compensation torque.

20. The method according to claim 16, wherein the step of calculating a target yaw and/or lateral vehicle state, including target vehicle lateral acceleration, curvature, road-wheel angle, steering-wheel angle, vehicle lateral velocity, vehicle slip angle, vehicle yaw rate or any linear combination of one or more thereof, comprises using at least one of a feed-forward PID controller and/or one or two feedback PID controllers.

21. A system for controlling vehicle lane holding of a vehicle with a steering system with a steering assistance actuator and one or more controllable vehicle state actuators comprising an on-board vision system, comprising:
    a control unit,
    one or more vehicle state sensors in communication with the control unit for measurement of at least one vehicle position input signal representing one or more vehicle states with the aid of the on-board vision system,
    a relative vehicle position calculation function programmed in the control unit for determination from said one or more measured vehicle position input signals of a relative vehicle lane position in the form of, but not limited to, a vehicle lateral lane position, a vehicle heading angle, a lane curvature and/or a lane curvature derivative, and for calculation of a target positioning vector comprising one or more of the following target values, a target lateral position, a target heading angle, a target curvature and a target curvature derivative,
    a sensor for measurement of at least one steering input signal,
    a driver torque calculation function programmed in the control unit for determination from said one or more measured steering input signals of a torque value applied by the driver via a steering wheel,
    a target relative vehicle state calculation function programmed in the control unit for transformation of said torque value applied by the driver to a target delta positioning vector,
    the control unit is programmed for adding said target positioning vector and said target delta positioning vector together to form a mixed control target lateral state vector, and
    the control unit is programmed for using the mixed control target positioning vector as reference signal to one or more controllers for the control of the one or more vehicle state actuators.

22. The system according to claim 21, wherein, in the driver torque calculation function, the sensor signals from the steering system, are used for calculation of a torque applied by a driver of the vehicle.

23. The system according to claim 21, wherein the target delta vehicle state is a relative lateral position and the target relative vehicle state calculation function is adapted to transform the driver torque to a relative lateral position.

24. The system according to claim 21, wherein the target delta vehicle state is a delta lateral velocity relative to a target trajectory calculated in the relative vehicle position calculation function, and the target relative vehicle state calculation function is adapted to transform the driver torque to a relative lateral position, and further comprises an integration function adapted to integrate the delta lateral velocity once to provide a delta lateral position forming the target delta positioning vector.

25. The system according to claim 21, wherein the target delta vehicle state is a delta lateral acceleration relative to a target trajectory calculated in the relative vehicle position calculation function, and the target relative vehicle state calculation function is adapted to transform the driver torque to a relative lateral position, and further comprises an integration function adapted to integrate the delta lateral acceleration twice to provide a delta lateral position forming the target delta positioning vector.

26. The system according to claim 21, wherein the target delta vehicle state is a delta lateral vehicle slip angle relative to a target trajectory calculated in the relative vehicle position calculation function, and the target relative vehicle state calculation function is adapted to transform the driver torque to a relative lateral position, and further comprises an integration function adapted to integrate the delta lateral vehicle slip times the vehicle speed once to provide a delta lateral position forming the target delta positioning vector.

27. The system according to claim 21, wherein the target delta vehicle state is a delta curvature relative to a target trajectory calculated in the relative vehicle position calculation function, and the target relative vehicle state calculation function is adapted to transform the driver torque to a relative lateral position, and further comprises an integration function adapted to integrate the delta lateral curvature times the square of the vehicle speed twice to provide a delta lateral position forming the target delta positioning vector.

28. The system according to claim 21, wherein the target delta vehicle state is a delta yaw rate relative to a target trajectory calculated in the relative vehicle position calculation function, and the target relative vehicle state calculation function is adapted to transform the driver torque to a relative lateral position, and further comprises an integration function adapted to integrate the delta yaw rate times the vehicle speed to provide a delta lateral position forming the target delta positioning vector.

29. The system according to claim 21, wherein the target delta vehicle state is a linear combination of one or more of the delta lateral position, the delta lateral velocity, the delta lateral acceleration, delta lateral vehicle slip angle, the delta curvature, the delta yaw rate.

30. The system according to claim 21, wherein in the target relative vehicle state calculation function transforming the driver torque to a relative lateral position, a threshold value is used for the driver torque, only allowing driver torques exceeding said threshold value to be transformed to a target delta vehicle state.

31. The system according to claim 21, wherein the mixed control target positioning vector at least comprises a mixed control target lateral position.

32. The system according to claim 31, wherein the mixed control target positioning vector further comprises one or more of a target heading angle, a target curvature and a target curvature derivative.

33. The system according to claim 21, wherein the vehicle state controller is adapted to calculate a target yaw and/or lateral vehicle state, and to control the vehicle actuators towards said target yaw and/or lateral vehicle state.

34. The system according to claim 33, wherein for calculating the target yaw and/or lateral vehicle state, the vehicle state controller is arranged to use at least one of a feed-forward controller and/or one or two feedback controllers.

35. The system according to claim 33, wherein for calculating the target yaw and/or lateral vehicle state, the vehicle state controller is arranged to use a sixth order polynomial or a conic spline describing the trajectory between a current positioning vector and a future mixed control positioning vector, the starting point being described by a y-coordinate, a heading angle and a curvature, the target point being described by a x-coordinate, the heading angle and the curvature.

36. The system according to claim 21, wherein, in the driver torque calculation function, the sensor signals from the steering system, are used for calculation of a torque applied by a driver of the vehicle, including torsion-bar torque signal, or a torsion bar torque compensated with a compensation torque.

37. The system according to claim 33, wherein for calculating the target yaw and/or lateral vehicle state, including target vehicle lateral acceleration, curvature, road-wheel angle, steering-wheel angle, vehicle lateral velocity, vehicle slip angle, vehicle yaw rate or any linear combination of one or more thereof, the vehicle state controller is arranged to use at least one of a feed-forward PID controller and/or one or two feedback PID controllers.

38. The system according to claim 34, wherein for calculating the target yaw and/or lateral vehicle state, including target vehicle lateral acceleration, curvature, road-wheel angle, steering-wheel angle, vehicle lateral velocity, vehicle slip angle, vehicle yaw rate or any linear combination of one or more thereof, the vehicle state controller is arranged to use a sixth order polynomial or a conic spline describing the trajectory between a current positioning vector and a future mixed control positioning vector, the starting point being described by a y-coordinate, a heading angle and a curvature, the target point being described by a x-coordinate, the heading angle and the curvature.

* * * * *